(12) United States Patent
Zachau et al.

(10) Patent No.: US 9,199,873 B2
(45) Date of Patent: Dec. 1, 2015

(54) PROCESS FOR PRODUCING A HIGHLY TRANSPARENT IMPACT-RESISTANT GLASS CERAMIC

(71) Applicants: Thilo Zachau, Bensheim (DE); Friedrich Siebers, Nierstein (DE); Ulrich Schiffner, Mainz (DE); Kurt Schaupert, Hofheim (DE)

(72) Inventors: Thilo Zachau, Bensheim (DE); Friedrich Siebers, Nierstein (DE); Ulrich Schiffner, Mainz (DE); Kurt Schaupert, Hofheim (DE)

(73) Assignee: SCHOTT AG, Mainz (DE)

( * ) Notice: Subject to any disclaimer, the term of this patent is extended or adjusted under 35 U.S.C. 154(b) by 344 days.

(21) Appl. No.: 13/705,577

(22) Filed: Dec. 5, 2012

(65) Prior Publication Data

US 2014/0150500 A1  Jun. 5, 2014
US 2015/0128646 A9  May 14, 2015

Related U.S. Application Data

(62) Division of application No. 12/616,982, filed on Nov. 12, 2009, now Pat. No. 8,404,350.

(30) Foreign Application Priority Data

Nov. 13, 2008 (DE) .......................... 10 2008 043 718

(51) Int. Cl.
*C04B 35/19* (2006.01)
*C03C 10/00* (2006.01)
*C03C 3/085* (2006.01)
*B32B 17/10* (2006.01)
*F41H 5/04* (2006.01)

(52) U.S. Cl.
CPC ........ *C03C 10/0027* (2013.01); *B32B 17/10045* (2013.01); *B32B 17/10119* (2013.01); *B32B 17/10761* (2013.01); *C03C 3/085* (2013.01); *F41H 5/0407* (2013.01); *B32B 2333/12* (2013.01)

(58) Field of Classification Search
CPC ...................................................... C04B 35/19
See application file for complete search history.

(56) References Cited

U.S. PATENT DOCUMENTS

| | | | |
|---|---|---|---|
| 6,673,729 B2 | 1/2004 | Siebers et al. | |
| 6,846,760 B2 | 1/2005 | Siebers et al. | |
| 2007/0232476 A1* | 10/2007 | Siebers et al. | 501/4 |
| 2007/0259767 A1* | 11/2007 | Siebers et al. | 501/59 |

(Continued)

FOREIGN PATENT DOCUMENTS

| | | |
|---|---|---|
| CA | 2 299 202 | 8/2000 |
| EP | 1 837 312 | 9/2007 |
| WO | 03/068501 | 8/2003 |

*Primary Examiner* — Joseph S Del Sole
*Assistant Examiner* — Russell Kemmerle, III
(74) *Attorney, Agent, or Firm* — Michael J. Striker

(57) ABSTRACT

The process for producing a transparent lithium aluminosilicate glass ceramic plate includes ceramicizing a green glass body of the $Li_2O$—$Al_2O$—$SiO_2$ system using a ceramization program, which includes heating it, for the purpose of nucleation, to a temperature of 750° C.±20° C. and maintaining the temperature for 20±15 minutes, further heating the green glass body, for the purpose of ceramization, to a temperature of 900±20° C. and maintaining the to temperature for 20±15 minutes and then cooling to room temperature. The transparent plate has a thermal expansion coefficient (CTE) from $-0.15 \times 10^{-6}$/K to $+0.15 \times 10^{-6}$/K at 30 to 700° C. and a brightness value observed at an angle of 2° of ≥80 for a 4-mm thick plate for transmitted normal light.

3 Claims, 1 Drawing Sheet

(56) References Cited

U.S. PATENT DOCUMENTS

| | | | |
|---|---|---|---|
| 2009/0018007 A1* | 1/2009 | Siebers et al. | 501/63 |
| 2010/0099546 A1* | 4/2010 | Aitken et al. | 501/4 |
| 2010/0154622 A1* | 6/2010 | Zachau et al. | 89/36.02 |
| 2010/0167903 A1* | 7/2010 | Comte et al. | 501/27 |
| 2012/0302422 A1 | 11/2012 | Siebers et al. | |
| 2014/0135201 A1* | 5/2014 | Chauvel-Melscoet et al. | 501/4 |
| 2014/0162039 A1* | 6/2014 | Zachau et al. | 428/219 |

* cited by examiner

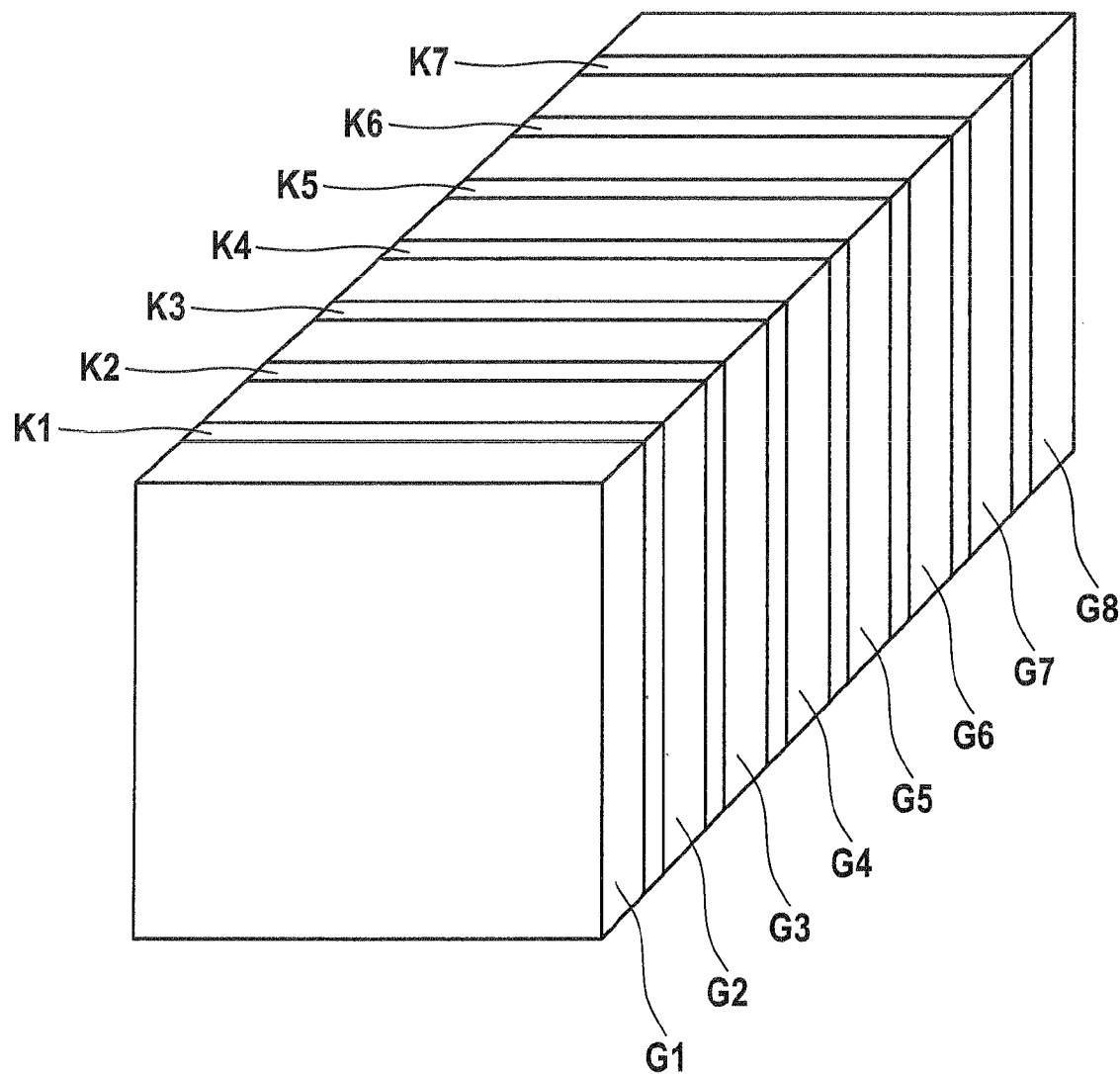

PROCESS FOR PRODUCING A HIGHLY TRANSPARENT IMPACT-RESISTANT GLASS CERAMIC

CROSS-REFERENCE

This is a divisional of U.S. patent application Ser. No. 12/616,982, filed on Nov. 12, 2009, which claims priority of invention based on German Patent Application 10 2008 043 718.2 filed on Nov. 13, 2008 in Germany. The aforesaid German Patent Application contains subject matter described and claimed herein below.

BACKGROUND OF THE INVENTION

The inventions described herein comprise a transparent plate made of lithium aluminosilicate glass ceramic having a high transmission, a process for making same and also transparent plate laminates comprising at least one of the plates of the lithium aluminosilicate glass ceramic according to the invention and the use thereof as armored glass or in bullet-proof vests.

Until now, the inherent color of transparent glass ceramics has been too strong. The reasons for the inherent color of transparent glass ceramics can vary. The constituents of the raw material mixtures for the melts contain the coloring element Fe as an impurity. The use of the refining agents $Sb_2O_3$ and $CeO_2$ also results in a slight inherent color. The described brownish-yellow intrinsic color of the transparent glass ceramics is based substantially on electronic transitions occurring on colored complexes which absorb in the region of visible light and in which the component required for nucleation, namely the Ti ion, takes part. The most frequent absorbing color complex stems from the formation of adjacent Fe and Ti ions between which electronic charge transfers take place. Sn—Ti complexes also impart an inherent color. The Fe/Ti color complexes lead to a red-brown discoloration and the Sn/Ti color complexes to a yellow-brown one. The formation of these adjacent color complexes takes place already during the cooling of the parent glass and particularly during the subsequent ceramization of the glass ceramic. In the melt, the ions are still uniformly distributed, but during cooling at high temperatures and during ceramization they preferably bind to each other. As a result, during the ceramization of the transparent glass ceramics, the inherent color intensifies very markedly compared to that of the parent glass. By absorption in the short-wave region of the visible spectrum, transparent flat glasses and particularly the glass ceramics produced therefrom assume a pronounced inherent color which increases considerably with thickness.

It is known that the inherent color of glass ceramics can be reduced by overcoloring. The principle of overcoloring an undesirable color tinge naturally leads to stronger light absorption thus reducing the overall transmission, because the absorptions taking place are neutralized by the absorptions of complementary light portions by the overcoloring agent.

Glass ceramic plates find use in, among other applications, bullet-proof glass plates. In the production of such glass plates, several different glass or glass ceramic layers and plastic sheets are linked. The temperature- and pressure-controlled process of linking the individual layers and plastic materials to each other, in particular, is time-consuming and cost-intensive. The many interfacial transitions between glass plates and plastic materials result in poor transmission characteristics which may lead to the formation of interference fringe patterns in the form of Newton fringes. Also, the large amount of glass, namely the high number of glass plates in the known bullet-proof plates results in their exhibiting a very high weight per unit area. The high weight per unit area leads to a significant construction cost for installation and vitrification.

SUMMARY OF THE INVENTION

Hence, one object of the present invention is to provide a process for producing a glass ceramic plate, which is free of the disadvantages of the prior art plates and which is suitable for use as armored glass or in a bullet-proof .vest.

Another object of the present invention is to provide glass ceramic plates exhibiting high overall transmission for visible light. In particular, these glass ceramic plates show a high overall transmission for visible light which manifests itself in a high brightness value for transmitted standard light A under 2° observation) ($Y_{A/2°}$).

Another object of the present invention is to provide plate laminates, comprising at least one glass ceramic plate, exhibiting high overall transmission for visible light and/or a high hardness. In particular, these plate laminates show a high overall transmission for visible light and their light brightness value Y for transmitted standard light A under 2° observation is $Y_{A/2°} > 50$.

Another object of the present invention is to provide plate laminates, comprising at least one glass ceramic plate, said laminates exhibiting better resistance to dynamic stresses compared to plate laminates with conventional glass ceramic plates and the same weight per unit area.

Another object of the present invention is to provide plate laminates, comprising at least one glass ceramic plate, said laminates exhibiting improved transparency thus ensuring bullet impact re-sistance meeting the requirements of NATO Standardization Agreement, STANAG 4569, Level 2 and 3. The plate laminates also ensure bullet impact resistance against armor-piercing projectiles, namely against armor-breaking projectiles.

The aforesaid objectives are reached by providing a transparent plate made of lithium aluminosilicate glass ceramic containing the following constituents in weight %, based on the overall composition:

| | |
|---|---|
| $Li_2O$ | 3.0-4.5 |
| $Al_2O_3$ | 18.0-24.0 |
| $SiO_2$ | 55.0-70.0 |
| $TiO_2$ | 0-2.3 |
| $ZrO_2$ | 0-2.0 |
| $\Sigma TiO_2 + ZrO_2$ | 0.5-4.3 |
| $SnO_2$ | 0-0.2 |
| MgO | 0-0.8 |
| $Fe_2O_3$ | 40-200 ppm |
| $As_2O_3$ | 0.3-0.9 as chemical refining agent. |

The plate preferably contains from 40 to 130 ppm of $Fe_2O_3$, and the $TiO_2$ content is preferably higher than 0.01 wt. % and particularly higher than 0.5 wt. %.

The reduction in Fe content is economically feasible only to a certain degree. A certain amount of Fe or $Fe_2O_3$ always enters the mixture with the industrially used raw materials for the production of the glass and with the abraded material from the units for the production, homogenization and transportation of the mixture. Because of the elevated cost of high-purity raw materials or of the special measures applied to industrial units, it is economically no longer feasible to drop the Fe$_2$O$_3$ content of industrially produced transparent glass ceramics below about 40 ppm.

For purposes of the present invention, by a glass ceramic is meant an inorganic, nonporous material with a crystalline phase and a glass phase in which, as a rule, the matrix, namely the continuous phase, is a glass phase. The combination of a crystalline and a glass phase imparts to a glass ceramic its special properties.

For purposes of the present invention, visible light is light with a wavelength from 380 to 780 nm.

The brightness value Y of the CIE-xyz color-measuring system is always reported for transmitted standard light A and for an observation angle of 2° and can be determined from wavelength-resolved transmission spectra with the aid of the CIE-defined eye-sensitivity curves x(λ), y(λ) and z(λ) (tristimulus curves) (International Illumination Commission Proceedings, 1931, Cambridge University Press, Cambridge, or DIN 5031):

$$X = \int_0^\infty l(\lambda) \bar{x}(\lambda) d\lambda$$

$$Y = \int_0^\infty l(\lambda) \bar{y}(\lambda) d\lambda$$

$$Z = \int_0^\infty l(\lambda) \bar{z}(\lambda) d\lambda,$$

wherein λ is a wavelength of monochromatic light; l(λ) is an intensity of the monochromatic light, specifically l(λ)=τ(λ)·f$_{A/2}$(λ), wherein τ(λ) is the wavelength-resolved transmission of the sample and f$_{A,2}$(λ) is the wavelength-resolved intensity factor for standard light A observed under a 2° angle.

The factor coordinates are calculated from:

$$x = \frac{X}{X+Y+Z}$$

$$y = \frac{Y}{X+Y+Z}$$

$$z = \frac{Z}{X+Y+Z}.$$

The achromatic point for standard light A is defined by:

$$x_{u,A} = 0.4476$$

$$y_{u,A} = 0.4074.$$

The abbreviation CTE refers to the linear thermal expansion coefficient of a material that can be indicated for different temperature ranges. CTE (Δl/l$_o$ΔT) in ppm/K is determined by dilatometric measurements with a TDA (thermal dilatometric analyzer), Harrop Model TD 710, in accordance with DIN ISO 7991.

Preferably, the transparent plate contains the following additional constituents, in wt. % based on the overall composition:

| | |
|---|---|
| BaO | 0-3 |
| Na$_2$O | 0-1.5 |
| ZnO | 0-2.5 |
| ZrO$_2$ | 0.5-2. |

The oxides Li$_2$O, Al$_2$O$_3$ and SiO$_2$ are required constituents of the glass ceramic and are present within the preferred limits cited in the claims. In general, a minimum amount of 3 wt. % of Li$_2$O is needed, but Li$_2$O contents exceeding 4.5 wt. % often cause undesirable devitrification during the manufacturing process. An Li$_2$O content of 3.2 to 4.3 wt. % gives particularly good results.

To prevent excessively high glass viscosities and to suppress the tendency toward undesirable devitrification during shaping, the Al$_2$O$_3$ content is limited to a preferred minimum of 18 wt. % to a preferred maximum of 24 wt. %. When the Al$_2$O$_3$ content is below 19 wt. %, the transparency of the glass ceramic is reduced. The SiO$_2$ content should preferably amount to a maximum of 70 wt, %, particularly 68 wt. %, because this component causes a marked increase in the viscosity of the glass. Hence, higher SiO$_2$ contents are deleterious for the melting of the glasses because of the temperature stress exerted during shaping. The minimum SiO$_2$ content should preferably amount to 55 wt. % and particularly 60 wt. %.

MgO and ZnO can be incorporated into the crystalline phase as additional components. Because of the problem of undesirable formation of crystal phases such as Zn spinel during ceramization, the ZnO content is limited to a maximum of 2.5 wt. % and preferably to a maximum of 2 wt. %. The MgO content is limited to a maximum of 0.8 wt. % and preferably to a maximum of 0.65 wt. %, because otherwise the expansion coefficient of the glass ceramic is increased inadmissibly. A low MgO content is also advantageous in suppressing the inherent color of the glass ceramic. As a rule, a minimum MgO content of 0.3 wt. % is required to prevent the thermal expansion of the glass ceramic in the temperature range from 30° C. to 700° C. from decreasing to negative values below-0.3×10$^{-6}$/K.

The glass ceramic contains as nucleating agents TiO$_2$ and ZrO$_2$ and preferably only TiO$_2$. SnO$_2$ can also serve as nucleating agent. The amount of TiO$_2$ used is preferably in the range between 1.8 and 2.3 wt. % and most preferably between 2.0 and 2.3 wt. %. The amount of ZrO$_2$ is preferably in the range between 0.5 and 2 wt. % and most preferably between 1.5 and 2 wt. %. If these two nucleating agents are used together, the sum of the amounts of TiO$_2$+ZrO$_2$ should not exceed 4.3 wt. %, and preferably not 2.3 wt. %.

The aforesaid amounts of nucleating agents allow ceramization to be carried out in a short time, preferably within a period of 1 to 2 hours. Because of the low amount of TiO$_2$, the strength of the inherent color is also reduced.

ZnO, MgO and BaO, are added to the composition to improve the melt properties of the glass ceramic and to stabilize the glass phase. ZnO also makes it possible to influence the thermal expansion coefficient (CTE) while MgO and BaO cause this coefficient to increase. Also, higher contents of the aforesaid metals can affect the crystallization behavior during the conversion of the glass into the glass ceramic and they exert a deleterious effect on the thermal stress resistance of the glass ceramic. Preferably, the glass ceramic of the present invention contains 1 to 2.6 wt. % of ZnO, 0.3 to 0.8 wt. % of MgO and 0 to 3 wt. % of BaO. Most preferably, the glass ceramic of the present invention contains 1 to 2 ZnO, 0.3 to 0.65 MgO and 0 to 2 BaO, each expressed in wt. %.

The glass ceramic of the present invention can also contain 0 to 1.5 wt. % and preferably 0 to 1 wt. % of Na$_2$O. After ceramization, the alkali metal ions, for example the sodium ions, remain in the residual glass phase. They increase the thermal expansion coefficient and can therefore be used when the thermal expansion coefficient values are too negative. If, however, they are used in excessive amounts, the thermal expansion becomes too high, and the nucleation is difficult to control.

The glass ceramics according to the invention are refined by use of arsenic oxide, the refining agent commonly used in the $Li_2O$—$Al_2O_3$—$SiO_2$ system. Alternatively or in combination, $SnO_2$ can also be used in amounts of up to 0.2 wt. %, especially for high-temperature refining at >1700° C. Other refining agents, for example, $Sb_2O_3$, $CeO_2$, sulfate compounds, chloride compounds or fluoride compounds, can also be added to the glass melt. The total amount of refining agents and additives should not exceed 1.2 wt. %. Preferably, $As_2O_3$ is used as the only refining agent.

At low contents of $As_2O_3$, $Sb_2O_3$ or $SnO_2$ refining agents, it may be necessary to combine the chemical refining with high-temperature refining above 1700° C. if good bubble quality with bubble numbers below 5 bubbles/kg of glass (based on bubble sizes >0.1 mm) is desired. It is particularly advantageous, if inherent color is to be avoided, to refine the glass ceramic exclusively with $As_2O_3$ as the refining agent and not to use antimony oxide and tin oxide as refining agents. Other refining agents, such as sulfate, chloride or fluoride compounds, may also be added in a total amount of up to 1 wt. %.

Preferably, the thickness of the transparent glass ceramic plate is in the range from 2 and 20 mm, particularly in the range from 4 and 15 mm and especially in the range from 6 and 12 mm.

The transparent plate according to the invention, at a thickness of 4 mm, preferably shows a brightness value $Y_{A/2}°$ of >80, preferably >85 and most preferably >89.

The thermal expansion coefficient (GTE) between 30 and 700° C. is preferably in the range between −0.15 to +0.15×$10^{-6}$/K and more preferably in the range between −0.05 to 0.1×$10^{-6}$/K.

The Knoop hardness of a glass ceramic according to the invention is determined in accordance with DIN ISO 9385, edition of 1991-01.

The Knoop diamond is impressed under a load of 0.1 N for 20 seconds. The Knoop hardness of the glass ceramic plate of the invention is $HK_{01/20}$≥500, preferably $HK_{01/20}$≤550 and most preferably $HK_{0.1/20}$≥580.

Another object of the invention is a process for producing the glass ceramic of the invention.

It is generally known that glasses of the $Li_2O$—$Al_2O_3$—$SiO_2$ system can be converted into glass ceramics in which high-quartz mixed crystals are the main crystal phase. To this end, the following procedure is used: A suitable composition of suitable raw materials is melted, refined, homogenized and then, while hot, shaped to form a glass blank or green body, for example by rolling, casting, pressing or, recently, floating. By "green body" of a glass ceramic is meant a glassy body obtained from a melt of suitable composition which by treatment according to a suitable temperature program can be converted into a glass ceramic.

The cooling and annealing of the molten green body is followed by a heat treatment whereby the glass is converted into a glass ceramic by controlled bulk crystallization. In the course of this heat treatment, in a first conversion step ("nucleation agent separation") crystallization nuclei of the same or different kind are formed in the glass. By crystallization nuclei or crystal nuclei are meant submicroscopic crystalline aggregates of a characteristic size. In a second conversion step ("crystallization"), possibly at a slightly higher temperature, crystals or crystallites grow on the crystal nuclei. The glass ceramic of the invention is preferably produced in accordance with the following ceramization program:
heating to a temperature of 750±20° C. and holding this temperature for 20±15 minutes;
further heating, for purposes of ceramization, to a temperature of 900±20° C. and holding this temperature for 20±15 minutes, then cooling to room temperature.

The cooling to room temperature requires no particular temperature program. As a rule, it is carried out by exposing the hot plates to room air. The cooling time usually ranges from −10 K/min to <−100 K/min.

Another object of the present invention is a transparent plate of lithium aluminosilicate glass ceramic which contains the following constituents, expressed in wt. % based on the total composition:

| | |
|---|---|
| $Li_2O$ | 3.0-4.5 |
| $Al_2O_3$ | 18.0-24.0 |
| $SiO_2$ | 55.0-70.0 |
| $TiO_2$ | 0-2.3 |
| $ZrO_2$ | 0-2.0 |
| $\Sigma TiO_2 + ZrO_2$ | 0.5-4.3 |
| $SnO_2$ | 0-0.2 |
| MgO | 0-0.8 |
| $Fe_2O_3$ | 40-200 ppm |
| $As_2O_3$ | 0.3-0.9 as chemical refining agent, | and is prepared in accordance with the following ceramization program:
heating for the purpose of nucleation to a temperature of 750±20° C. and holding this temperature for 20±15 minutes;
further heating for the purpose of ceramization to a temperature of 900±20° C. and holding this temperature for 20±15 minutes, then cooling to room temperature.

The aforesaid transparent glass ceramic plate is appropriate for the production of plate laminates with a high bullet penetration resistance and high transparency for visible and infrared light in the wavelength range between 380 and 1100 nm. Moreover, the thermo-mechanical properties of the glass ceramic according to the invention make it possible to use it in fire safety glazing, as fireplace sight glass, ceramic hob, substrate for semiconductor materials or substrate for magnetic storage plates.

Another object of the present invention is a transparent plate laminate which, in particular, shows a high resistance to bullet penetration and a high optical transmission.

The plate laminate according to the invention comprises at least one transparent glass ceramic plate (a), as described in the foregoing, optionally at least one plate (b) selected from the group consisting of borosilicate glass, soda lime glass and aluminosilicate glass which can also be chemically or thermally prestressed, and at least one plate (c) selected from the group consisting of polycarbonate, polyacrylate, particularly poly(methyl methacrylate), cellulose acetate butyrate, nylon, polyolefin, polyester, polyurethane and a mixture thereof.

According to German industrial standard DIN 52290, part 3 (06/1984), and/or according to German industrial standard DIN 52290, part 2 (11/1988), the plate laminate of the invention exerts breakthrough-inhibiting properties. The plate laminate according to the invention also ensures bullet penetration resistance that meets the requirements of the NATO Standardization Agreement, STANAG 4569, Levels 2 and 3.

Preferably, plate (c) consists of transparent polycarbonate (PC), poly(methyl methacrylate) (PMMA) or polyurethane (PU).

The number of plates in the transparent plate laminate is limited only by the requirements for high transmission it must meet. The number of plates (a), (b) and (c) preferably amounts to 2 to 10, more preferably to 3 to 9 and most preferably to 4 to 8. A plate (a) is preferably oriented outward or is furthest away from the object to be protected. For armored glass, for example, this means that plate (a) is the first plate that must withstand external influences. Preferably, plate (c) is oriented closest to the object to be protected. In the case of armored glass, this means that plate (c) is the plate that lines the internal space of a motor vehicle.

Preferred is a plate arrangement that shows the following plate sequence, in all cases from the outside (furthest away from the object to be protected) toward the inside (closest to the object to be protected):

8-Plate Laminate Embodiments
(a)-(a)-(a)-(a)-(a)-(a)-(a)-(c)
(b)-(b)-(a)-(a)-(b)-(b)-(a)-(c)
(a)-(a)-(a)-(b)-(b)-(b)-(b)-(c)
(a)-(a)-(b)-(b)-(a)-(a)-(a)-(c)
(a)-(a)-(b)-(b)-(a)-(a)-(b)-(c)

7-Plate Laminate Embodiments
(a)-(a)-(a)-(b)-(b)-(b)-(c)
(b)-(b)-(b)-(a)-(a)-(b)-(c)
(a)-(a)-(b)-(a)-(b)-(b)-(c)

6-Plate Laminate Embodiments
(a)-(a)-(b)-(b)-(a)-(c)
(a)-(a)-(a)-(b)-(b)-(c)
(a)-(b)-(a)-(b)-(b)-(c)

Plate (b) preferably has a thickness ranging from 3 to 20 mm, particularly from 5 to 15 mm and most preferably from 5 to 10 mm.

The thickness of plate (c) is preferably in the range from 3 to 15 mm, particularly from 5 to 15 mm and most preferably from 8 to 13 mm. The thickness of plate (a) in the plate laminate is preferably in the range from 3 to 20 mm, particularly in the range from 4 to 15 mm and most preferably in the range from 6 to 12 mm.

The thickness of the plate laminate is preferably in the range from 30 to 100 mm, particularly in the range from 40 to 80 mm and most preferably in the range from 60 to 80 mm.

Preferably, plates (a)-(a), (a)-(b) and (b)-(b), independently of each other, are attached to each other with a bonding agent selected from the group consisting of casting resins or reactive resins based on polyurethanes, polyvinylbutyral (PVB), cross-linked polyurethanes, partly cross-linked polyurethanes, polyureas, epoxides, unsaturated or saturated polyesters, polybutylene terephthalates (PBT), poly-(meth)acrylates, silicones or silicone resin polymers, or from the group of hot-melt adhesives, coatings or sealants selected from the group consisting of hot-melt adhesives based on polyethylene or copolymers thereof, particularly ethylene vinylacetate (EVA) or polyvinyl acetate or mixtures thereof. More preferably plates (a)-(a), (a)-(b) and (b)-(b), independently of each other, are connected to each other with a bonding agent selected from the group consisting of casting resins or reactive resins based on polyurethanes, polyvinylbutyral and hot-melt adhesives based on ethylene vinylacetate. Most preferably, plates (a)-(a), (a)-(b) and (b)-(b) are connected with polyvinylbutyral or polyurethane in the form of a film.

Plates (a)-(c), (b)-(c) and (c)-(c), independently of each other, are attached to each other with a bonding agent selected from the group consisting of casting resins or reactive resins based on poly-urethanes, polyvinylbutyral (PVB), cross-linked polyurethanes, partly cross-linked polyurethanes, polyureas, epoxides, unsaturated or saturated polyesters, polyethylene terephthalates (PET), poly-butylene terephthalates (PBT), poly(meth)acrylates, silicones and silicone resin polymers, or from the group of hot-melt adhesives, coatings or sealants selected from the group consisting of hot-melt adhesives based on polyethylene or copolymers thereof, particularly ethylene vinyl acetate (EVA), or polyvinyl acetate or mixture thereof. Most preferably, the (a)-(c), (b)-(c) and (c)-(c) plates, independently of each other, are connected by means of a bonding agent selected from the group consisting of casting resins or reactive resins based on polyurethanes, polyvinylbutyral and hot-melt adhesives based on ethylene vinylacetate. Most preferably, the (a)-(c), (b)-(c) and (c)-(c) plates are connected by means of polyvinylbutyral in the form of a film.

A transparent plate laminate according to the present invention that uses the transparent glass ceramic plates of the invention shows a lower weight per unit area than do corresponding transparent plate laminates containing conventional glasses or glass ceramics. Preferably, the weight per unit area of the plate laminate is in the range between 50 and 150 kg/m$^2$, more preferably in the range between 50 and 120 kg/m$^2$ and most preferably in the range between 50 and 100 kg/m$^2$ and it meets the requirement of "NATO AEP-55 STANAG 4569—Level II or III" by stopping, for example, hard-core bullets of the 7.62×39 API BZ type striking at 695 m/s, and bullets with a tungsten carbide core of the 7.62×51 AP type striking at 930 m/s or hard-core bullets of the 7.62×54R B32 API type striking at 854 m/s.

The thickness of the bonding agent layers preferably ranges from 0.05 to 2 mm, more preferably from 0.1 to 1 mm and most preferably from 0.2 to 0.8 mm.

Another object of the present invention is a process for producing the plate laminate that comprises the following steps:
cutting out plates (a), (b) and (c),
cleaning plates (a), (b) and (c),
stacking up the plates and introducing a bonding agent into the spaces between the individual plates (a), (b) and (c), possibly exposing the stack to heat treatment to activate the bonding agent, possibly under vacuum or by exerting high pressure on the stack, and
cooling the laminate.

A similar process for producing a laminate is described, for example, in US 2008-187721 AA (SO-CLIMA GmbH) or EP 0 331 648.

By the invention-provided possibility to use only few and possibly thin glass ceramic plates, the transmission properties of the plate laminate of the invention are much improved. Also, the plate laminates according to the invention possess outstanding color neutrality because of the use of glass ceramic plates which can be thinner compared to those of the prior art.

Another object of the present invention is the use of a glass ceramic plate according to the invention or the use of a plate laminate according to the invention, as described in the foregoing, as part of an armored glass or as part of a bullet-proof vest.

The armored glass according to the invention ensures maximum energy absorption when a bullet strikes. This splinter-proof design preferably serves to protect the persons present in a motor vehicle or building provided with such an armored glass from being hit by flying glass splinters stemming from a glass pane hit by a bullet.

BRIEF DESCRIPTION OF THE DRAWING

FIG. 1 is a schematic perspective view of a plate laminate of the present invention.

DESCRIPTION OF THE PREFERRED EMBODIMENTS

G1 to G8 represent plates made of glass, glass ceramic or plastic material.

K1 to K7 represent layers of bonding agents based on a plastic material, particularly films of polyvinylbutyral or polyurethane that as a rule are currently used for the production of laminated glass.

EXAMPLES

Four different glass ceramics of different composition, examples 1 to 4 in Table 1 here below, were prepared (data are given in wt. % based on oxides). The brightness value $Y_{A,2°}$ Is GIVEN for a glass thickness of 4 mm and the linear thermal expansion coefficient (CTE) is given for the range between 30 and 700° C. The linear thermal expansion coefficient CTE was determined in the 30 to 700° C. temperature range in accordance with DIN ISO 7991 by use of a Thermal Dilatometric Analyzer, Harrop Model TD 710.

To prepare the glass ceramics, first a green glass of the same composition was prepared in the usual manner. From this green glass, glass plates of the desired thickness were then made. The glass plates were then ceramized in the known manner to form glass ceramic plates, the nucleating agents having been formed in the glass at a temperature of 750° C. and a residence time of 20 minutes. The glass was then heated to the crystallization temperature of 830° C. The crystallization was allowed to occur at a temperature ranging from 830° C. to 900° C., the temperature being raised from 830° C. to 900° C. at a rate of 10 K per minute with a 10-minute residence time at 900° C.

To determine the brightness value $Y_{A/2°}$, first the wavelength-dependent transmission $\tau(\lambda)$ of a 4-mm-thick sample of the glass ceramic was measured and standardized to normal light A $$I(\lambda) = \tau(\lambda) \cdot f_A(\lambda) \quad (A = 350 \ldots 800 \text{ nm})$$

Then Y was then calculated with the aid of the CIE-defined eye sensitivity curves $y_{avg}(\lambda)$ (International Illumination Commission Proceedings, 1931, Cambridge University Press, Cambridge, or DIN 5031):

$$Y = \int_{\lambda=380\,nm}^{\lambda=800\,nm} I(\lambda) \overline{y}(\lambda) d\lambda$$

TABLE 1

GLASS CERAMIC COMPOSITIONS, BRIGHTNESS VALUES AND THERMAL EXPANSION COEFFICIENTS THEREOF

| | Example: 1 | 2 | 3 | 4 |
|---|---|---|---|---|
| $Al_2O_3$ | 21.96 | 21.70 | 21.50 | 21.67 |
| $As_2O_3$ | 0.35 | 0.31 | 0.31 | 0.85 |
| BaO | 2.00 | 1.99 | 1.94 | 1.97 |
| $Fe_2O_3$ | 0.0050 | 0.0110 | 0.0120 | 0.0130 |
| $Li_2O$ | 3.78 | 3.76 | 3.66 | 3.72 |
| MgO | 0.60 | 0.58 | 0.58 | 0.58 |
| $Na_2O$ | 0.55 | 0.53 | 0.52 | 0.52 |
| $SiO_2$ | 65.04 | 65.50 | 65.80 | 64.96 |
| $TiO_2$ | 2.27 | 2.11 | 2.29 | 2.29 |
| ZnO | 1.70 | 1.68 | 1.64 | 1.67 |
| $ZrO_2$ | 1.73 | 1.80 | 1.76 | 1.77 |
| $SnO_2$ | <0.01 | <0.01 | <0.01 | <0.01 |
| Y(A/2°); 4 mm | 89.7 | 89.5 | 89.3 | 89.7 |
| CTE* (30-700° C.) | −0.08 | −0.11 | −0.1 | −0.1 |

*CTE values are in units of $10^{-6}$/K.

The glass ceramic of the invention according to example 4 was incorporated into a plate laminate. The plate laminate was prepared in an autoclave by common lamination methods using different glass and glass ceramic plates by interposing in each case one PVB film in accordance with the process parameters recommended by the manufacturer of the PVB film (BUTACITE® Clear, manufactured by DuPont).

Eleven plate laminates of different structures are listed in Table 2.

TABLE 2

TRANSPARENT PLATE LAMINATE COMPOSITION AND PROPERTIES

| Ex. | G1 | K1 | G2 | K2 | G3 | K3 | G4 | K4 | G5 | K5 | G6 | K6 | G7 | K7 | G8 |
|---|---|---|---|---|---|---|---|---|---|---|---|---|---|---|---|
| 6b | 2-4 mm | 7 | 2-10 mm | 7 | 2-10 mm | 7 | 2-10 mm | 7 | 2-10 mm | 7 | 2-10 mm | 7 | 2-10 mm | 7 | 6-12 mm |
| 6a | 2-4 mm | 7 | 2-10 mm | 7 | 1-8 mm | 7 | 1-8 mm | 7 | 2-10 mm | 7 | 1-8 mm | 7 | 1-8 mm | 7 | 6-12 mm |
| 6 | 2-4 mm | 7 | 1-8 mm | 7 | 1-8 mm | 7 | 1-8 mm | 7 | 1-8 mm | 7 | 1-8 mm | 7 | 1-8 mm | 7 | 6-12 mm |
| 5 | 1-3 mm | 7 | 1-8 mm | 7 | 1-8 mm | 7 | 1-8 mm | 7 | 1-8 mm | 7 | 1-8 mm | 7 | 1-8 mm | 7 | 6-12 mm |
| 4a | 1-3 mm | 7 | 1-8 mm | 7 | 1-8 mm | 7 | 2-10 mm | 7 | 2-10 mm | 7 | 2-10 mm | 7 | 6-12 mm | | |
| 4 | 1-3 mm | 7 | 1-8 mm | 7 | 1-8 mm | 7 | 1-8 mm | 7 | 1-8 mm | 7 | 1-8 mm | 7 | 6-12 mm | | |
| 3a | 1-3 mm | 7 | 1-8 mm | 7 | 1-8 mm | 7 | 2-10 mm | 7 | 2-10 mm | 7 | 6-12 mm | | | | |
| 3 | 1-3 mm | 7 | 1-8 mm | 7 | 1-8 mm | 7 | 1-8 mm | 7 | 1-8 mm | 7 | 6-12 mm | | | | |
| 2a | 1-3 mm | 7 | 1-8 mm | 7 | 1-8 mm | 7 | 2-10 mm | 7 | 6-12 mm | | | | | | |
| 2 | 1-3 mm | 7 | 1-8 mm | 7 | 2-10 mm | 7 | 1-8 mm | 7 | 6-12 mm | | | | | | |
| 1 | 5-8 mm | 7 | 5-8 mm | 7 | 5-8 mm | 7 | 5-8 mm | 7 | 6-12 mm | | | | | | |

| Example | Thickness, mm | wt./unit area, kg/m² | Y(A/2°) | Antiballistic limit |
|---|---|---|---|---|
| 6b | 78.66 | 158 | 52.35 | 820 |
| 6a | 70.66 | 151.5 | 51.2 | 830 |
| 6 | 66.66 | 144 | 50.72 | 850 |
| 5 | 65.66 | 147 | 49.84 | 860 |
| 4a | 63.28 | 131 | 53.9 | 760 |
| 4 | 57.28 | 126 | 53.11 | 780 |
| 3a | 52.9 | 109 | 57.17 | 620 |
| 3 | 48.9 | 105.5 | 56.6 | 630 |
| 2a | 44.52 | 88 | 60.96 | 520 |
| 2 | 40.52 | 85 | 60.33 | 520 |
| 1 | 45.52 | 97.5 | 49.4 | 600 |

In Table 2, G1 to G8 indicate the bullet-proof layers and K1 to K7 the layers of the lamination film. The constituents of the individual layers are numbered, and when necessary their thickness is indicated in mm. The numbering of the individual layers has the following meaning:

1: Glass ceramic of the invention as per Example 4, Table 1.
2: Floated borosilicate glass with an expansion coefficient $CTE_{30\ldots300}$ of $3.3\times10^{-6}$ K$^{-1}$ (BOROFLOAT® 33, Schott AG, composition in wt. % about 81 $SiO_2$, 13 $B_2O_3$, 4 $Na_2O+K_2O$, 2 $Al_2O_3$).
5: Prior-art glass ceramic (EP 1,837,312, Example 3, rounded off composition in wt. %: 65.3 $SiO_2$, 21.8 $Al_2O_3$, 3.7 $Li_2O$, 2.3 $TiO_2$, 2 BaO, 1.7 ZnO, 1.8 $ZrO_2$, 0.6 MgO, 0.5 $Na_2O$, 0.3 $As_2O_3$, 0.1 $Nd_2O_3$).
6: Commercial impact-resistant poly(methyl methacrylate) (PLEXIGLAS RESIST®, Evonic industries, U.S. Pat. No. 5,726,245 A).
7: Polyvinylbutyrate film, thickness 0.38 mm (BUTACITE® Clear, DuPont).

To determine the weight per unit area, kg×m$^{-2}$, a 50×50 cm$^2$ plate was weighed and the result was converted into 1×m$^2$. The antiballistic limit m s$^{-1}$ was determined with a 7.62-mm caliber bullet weighing 10 g and containing steel core. Different bullet speeds were produced by means of different propelling charges. To determine the antiballistic limit, the test laminates were shot at with projectiles of different speed, and the antiballistic limit was then determined on the basis of the impact pattern for the different speeds.

Table 2 clearly indicates that plate laminates of the glass ceramic of the invention show a lower weight per unit area than do plate laminates of a different composition but with a comparable ballistic limit.

While the invention has been illustrated and described as embodied in a process for producing a highly transparent impact resistant glass ceramic, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A process for producing a transparent plate, said process comprising the following steps:
   a) preparing a green glass body comprising glass of a $Li_2O$—$Al_2O$—$SiO_2$ system; and
   b) using a ceramization program, said ceramization program comprising
      heating the green glass body, for the purpose of nucleation, to a nucleation temperature of 750±20° C. and holding said nucleation temperature for 20±15 minutes,
      further heating of the green glass body, for the purpose of ceramization to a ceramization temperature of 900±20° C. and holding said ceramization temperature for 20±15 minutes, and
      cooling to room temperature;
   wherein said transparent plate is a lithium aluminosilicate glass ceramic with a composition, expressed in wt. %, consisting essentially of:

| | |
|---|---|
| $Li_2O$ | 3.0-4.5 |
| $Al_2O_3$ | 18.0-24.0 |
| $SiO_2$ | 55.0-70.0 |
| $TiO_2$ | 0.01-2.3 |
| $ZrO_2$ | 0.01-2.0 |
| $\Sigma\ TiO_2 + ZrO_2$ | 0.5-4.3 |
| $SnO_2$ | 0-0.2 |
| MgO | 0.3-0.8 |
| BaO | 0-3 |
| $Na_2O$ | 0-1.5 |
| ZnO | 0-2.5 |
| $Fe_2O_3$ | 40-200 ppm and |
| $As_2O_3$ | 0.3-0.9 wt. %, | and having a thermal expansion coefficient (CTE) from $-0.11 \times 10^{-6}$/K to $-0.05 \times 10^{-6}$/K at 30° to 700° C.

2. The process according to claim 1, wherein said composition comprises from 40 to 130 ppm of said $Fe_2O_3$.

3. The process according to claim 1, wherein the transparent plate has a brightness value for transmitted normal light observed at an angle of 2° of >90 for a plate thickness of 4 mm.

* * * * *